No. 693,999. Patented Feb. 25, 1902.
J. CLARK.
AGRICULTURAL MACHINERY.
(Application filed Oct. 12, 1901.)
(No Model.) 3 Sheets—Sheet 1.
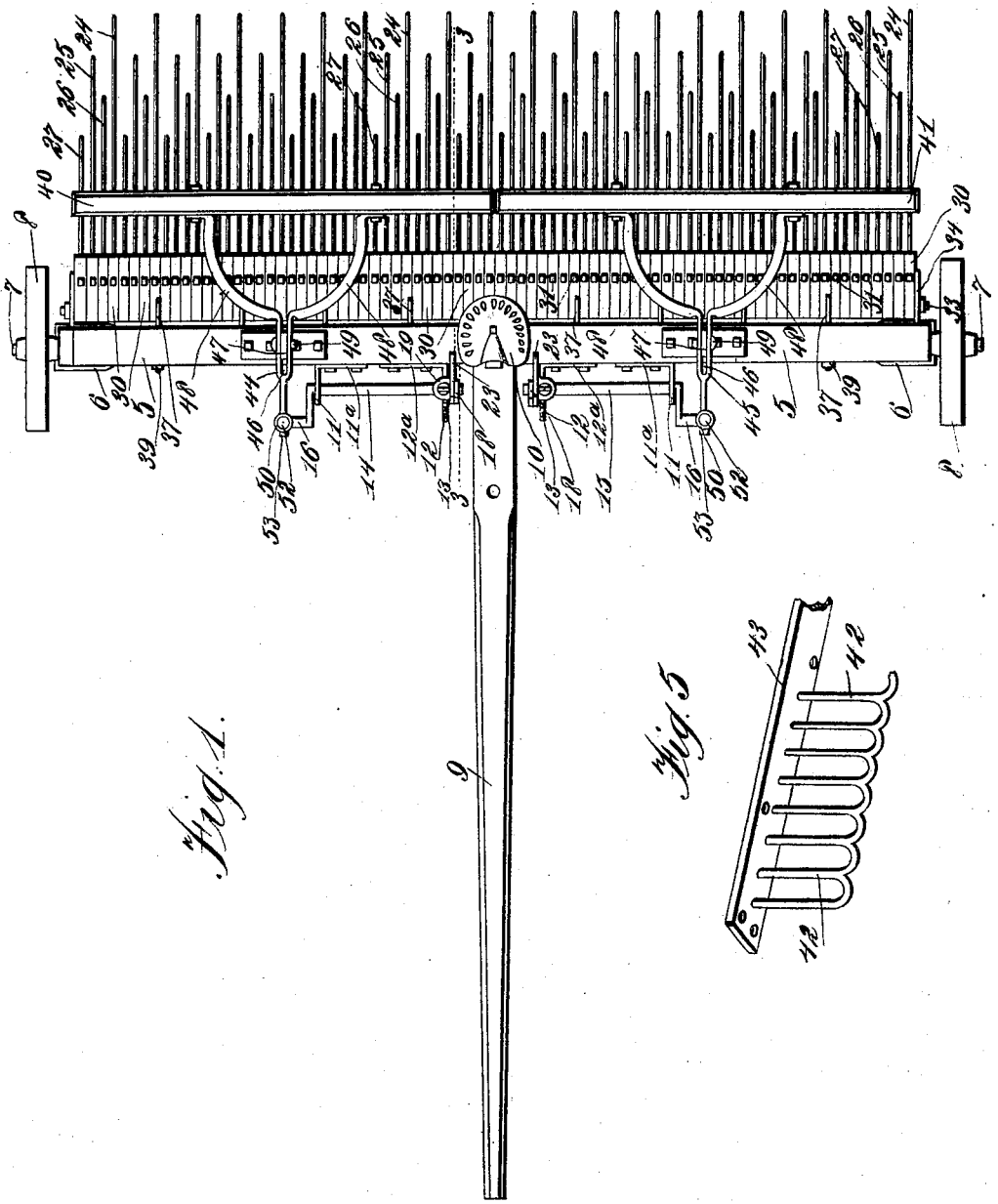
Witnesses: John Clark, Inventor,
By Marion & Marion
Attorneys No. 693,999. Patented Feb. 25, 1902.
J. CLARK.
AGRICULTURAL MACHINERY.
(Application filed Oct. 12, 1901.)
(No Model.) 3 Sheets—Sheet 2.
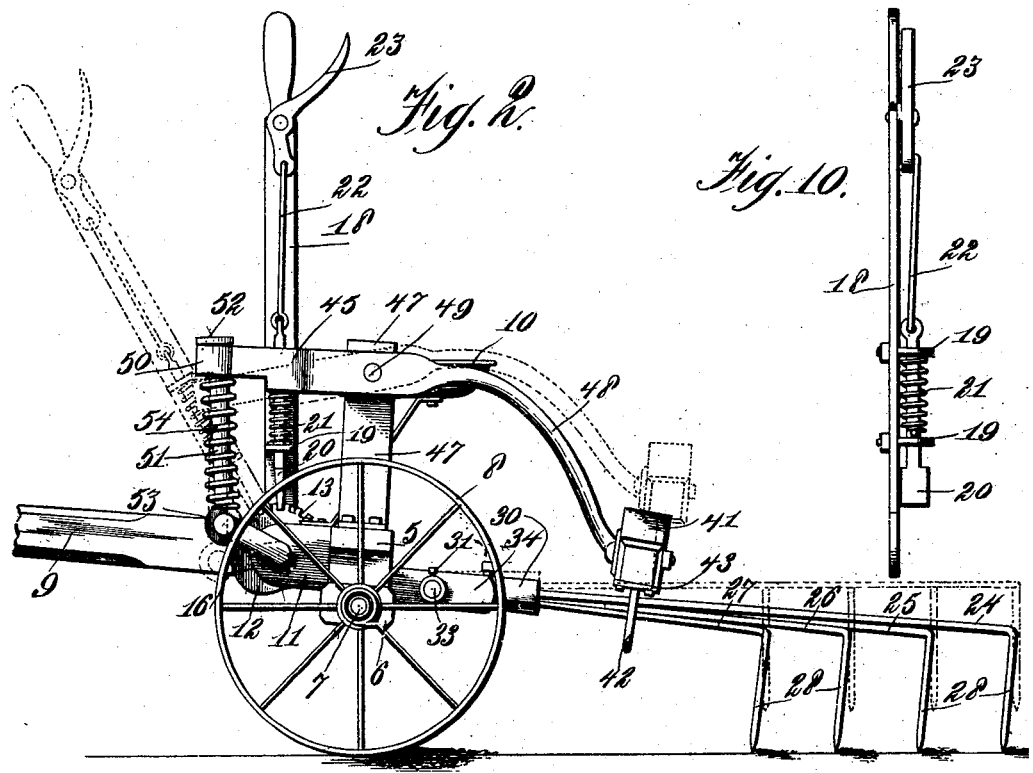
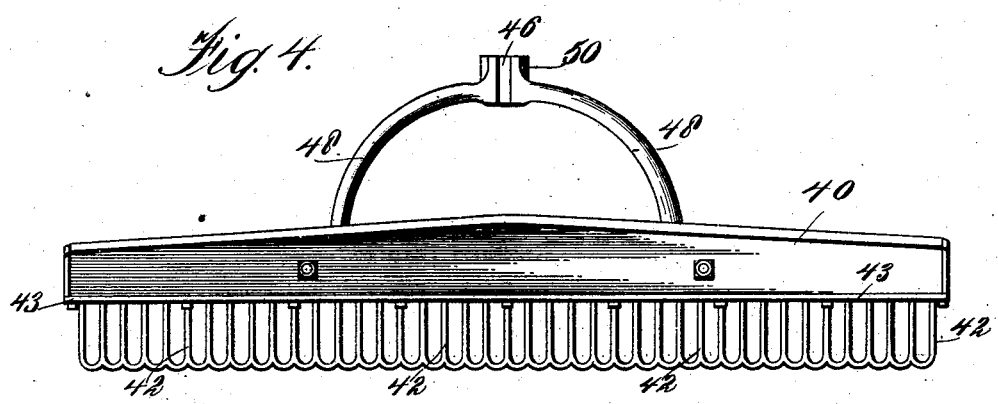
Witnesses: John Clark, Inventor,
By Marion & Marion
Attorneys No. 693,999. Patented Feb. 25, 1902.
J. CLARK.
AGRICULTURAL MACHINERY.
(Application filed Oct. 12, 1901.)
(No Model.) 3 Sheets—Sheet 3.
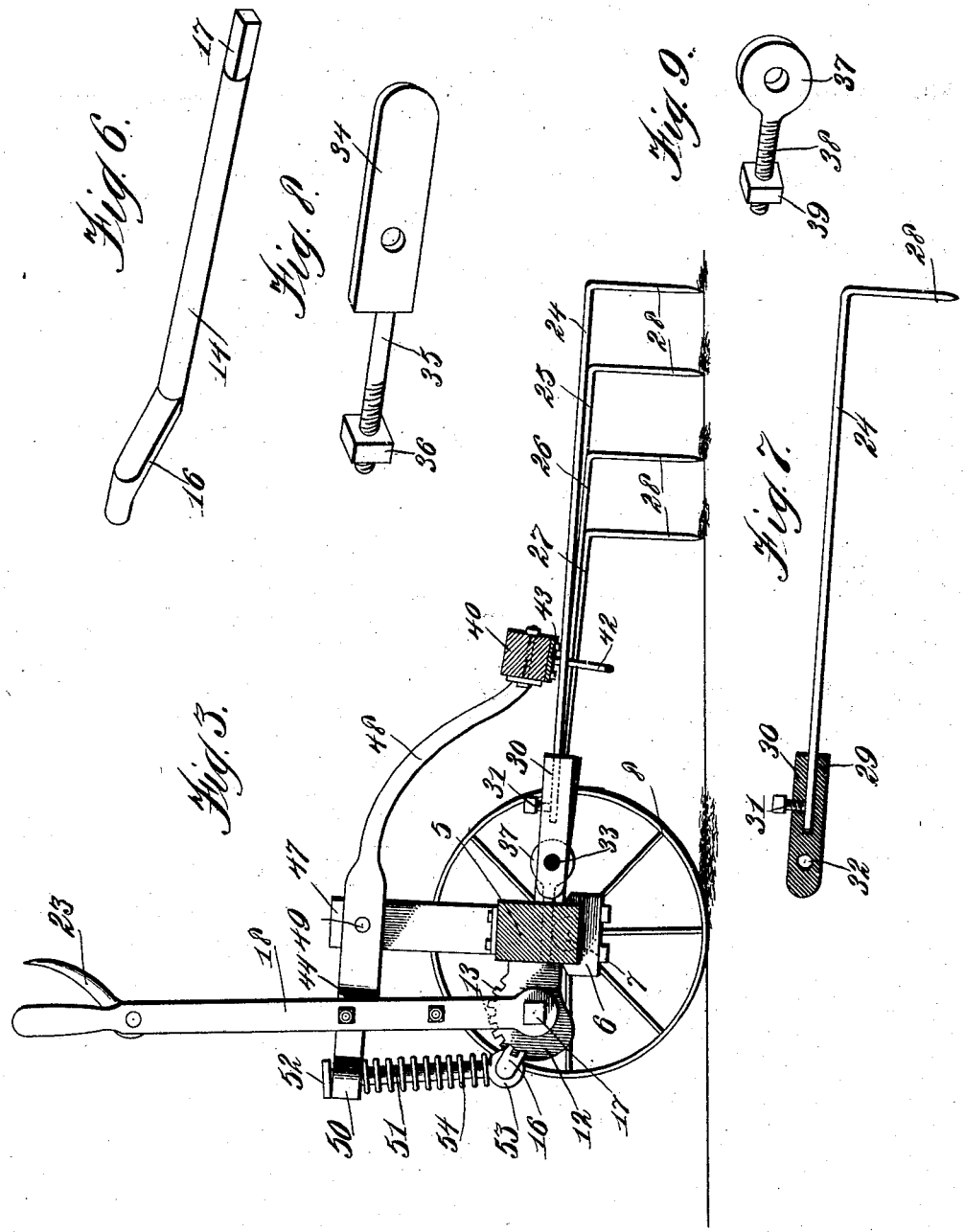
Witnesses: John Clark, Inventor,
By Marion & Marion
Attorneys

UNITED STATES PATENT OFFICE.

JOHN CLARK, OF CARMAN, CANADA.

AGRICULTURAL MACHINERY.

SPECIFICATION forming part of Letters Patent No. 693,999, dated February 25, 1902.

Application filed October 12, 1901. Serial No. 78,421. (No model.)

*To all whom it may concern:*

Be it known that I, JOHN CLARK, a subject of the King of Great Britain, residing at Carman, county of Dufferin, Province of Manitoba, Canada, have invented certain new and useful Improvements in Agricultural Machinery; and I do hereby declare that the following is a full, clear, and exact description of the invention, such as will enable others skilled in the art to which it appertains to make and use the same.

My invention relates to improvements in agricultural machinery of that class known as "cultivators" from the fact that the same are used for insuring the growth of crops.

The primary object of the invention is the provision of an improved machine which will thoroughly destroy the weeds and cultivate the crops at the one operation of passing the machine over the field.

A further object is to provide means for exerting pressure on the teeth when it is desired to have them penetrate quite deeply in the soil; but such pressure device is adapted to remain inactive, to the end that the teeth will have individually a free idle play or motion.

A further object is to provide means for easily adjusting the teeth to raised positions in order that weeds and other obstructions may be discharged from the teeth, and thereby prevented from clogging the same.

With these ends in view the invention consists in the construction and arrangement of parts, which will be hereinafter fully described and claimed.

In the drawings hereto annexed, forming a part of this specification, Figure 1 is a plan view of my cultivator. Fig. 2 is a side elevation thereof. Fig. 3 is a vertical section on the line 3 3 of Fig. 1. Fig. 4 is a detail view of one of the lifters for one-half of the teeth. Fig. 5 is a detail fragmentary perspective view of one of the lifters. Figs. 6, 7, 8, 9, and 10 are details which will be hereinafter described.

The same numerals of reference denote like parts in all the figures of the drawings.

5 designates the axle, which is preferably made of wood. To the end portions of this axle are firmly secured the flanged castings 6, which are provided with the integral axle-journals 7, on which are loosely mounted the carrying-wheels 8. The draft tongue or pole 9 is secured to the middle of the axle, and from this axle rises a standard adapted to carry the driver's seat 10.

To the front side of the axle are firmly bolted the pairs of brackets 11 12, one pair being disposed on one side of the tongue and the other on the opposite side of said tongue. The bracket 11 of each pair has an angular member 11ª, which is firmly bolted to the axle, and the member 12 of each pair of brackets is likewise provided with the member 12ª, that is bolted to the axle. (See Fig. 1.) The brackets 11 12 of each pair are disposed in alinement with each other, so as to receive one of the two rock-shafts which are provided in the machine, and this bracket 12 is furthermore provided with a series of notches 13.

14 15 designate the rock-shafts, which are journaled in the pairs of brackets 11 12, the same being disposed on opposite sides of the tongue. Each rock-shaft is provided with a crank 16 at one end; but the other end of the rock-shaft is made square, as indicated at 17 in Fig. 3. On this square end of the shaft is secured the lower extremity of an adjusting-lever 18, the same being provided with the keepers 19, in which is slidably fitted a latch 20. This latch is arranged to engage with either of the teeth 13 in the bracket 12, and said latch is held in engagement with said teeth by the spring 21. (See Fig. 10.) To the upper end of the latch is connected a rod 22, which is attached to a releasing-piece 23, that is pivoted on the lever, whereby the releasing-piece may be moved on its pivot to elevate the latch from engagement with the toothed bracket, and the lever may thus be swung in the forward or backward direction, so as to turn the rock-shaft in its bearings.

24 25 26 27 designate rods, which are of different lengths and are provided with teeth 28, which are of the same length, as clearly shown by Figs. 1, 2, and 3. These rods are arranged in substantially the same horizontal plane throughout the length of the machine; but as the rods are of different lengths it will be seen that the teeth 28 are disposed in four ranks, thus occupying staggered relation throughout the length of the machine. Each rod has its front end received in a socket 29 of a pivotal block 30, the number of blocks employed corresponding to the number of rods and teeth. The pivotal blocks each support a binding-screw 31, adapted to impinge upon the rod, and this block is furthermore provided with a transverse aperture 32. The series of pivotal blocks are disposed in close lapping relation, as shown by Fig. 1, so as to bring the series of perforations thereof in coincidence or alinement, and through these perforations of the pivotal blocks passes the pivotal rod 33. This rod has its end portions secured in the brackets 34, one of which is shown by Fig. 8. The brackets are provided with the threaded stems 35, that pass through the axle near the ends thereof and receive the nuts 36, whereby the brackets are firmly secured to the axle, and said brackets are made long enough to have overlapping relation with the end pivotal blocks of the series. (See Fig. 1.) The rod 33 is stayed at points intermediate of its length by engaging with the series of supporting-plates 37, one of which is shown by Fig. 9. Each supporting-plate is fitted between two adjacent pivotal blocks 30, and said supporting-plate has a threaded shank 38, that passes through the axle and is adapted to receive a nut 39.

40 41 designate the lifting-bars, each of which is long enough to extend over one-half the entire series of toothed rods. These lifting-bars are disposed above the toothed rods, and said bars have loose engagement with said rods through the series of loops or fingers 42. These fingers may be made integral with a plate or plates 43, (see Fig. 5,) that are adapted to be secured to the under side of a lifting-bar, or said fingers or loops 42 may be made of wire and fastened individually to the bar 40 or 41. The rods pass loosely through the loops, so that they will have a limited amount of play in the vertical direction with relation to the fingers and the lifting-bar; but when the bar and the fingers are raised the latter engage with the rods, so as to positively lift them and maintain the teeth free from engagement with the ground.

The lifting-bars 40 41 are adapted to be raised individually by means of the levers 44 45, each having a slotted portion 46, adapted to loosely embrace the post or standard 47, that rises from the axle 5, upon which said post or standard is firmly secured in any approved way. The lever 44 or 45 has its rear portion forked or bifurcated to provide the bowed and curved branches 48, that are firmly secured to the lifting-bars 40 41, and thus each lever is firmly secured at its rear bifurcated portion to one lifting-bar, while it is fulcrumed at a point intermediate of its length on the post 47 by means of the bolt or pin 49.

The free end of each lifting-lever 44 45 is formed with an eye 50, through which loosely passes the upper end of a stem 51, which is provided with a head 52, adapted to rest upon the eye-formed end of the lever. The lower end of this stem is enlarged to form the foot 53, having an eye adapted to receive the crank 16 of the rock-shaft, whereby the stem connects the rock-shaft and the lifting-lever operatively together. A coiled spring 54 is fitted loosely on each stem and is adapted to bear against the eye 50 of the lever 44 or 45 when the hand-lever 18 is moved in a backward direction.

In the position of the parts shown by Fig. 3 and by full lines in Fig. 2 the lifting-bars 40 41 are held by the lifting-levers, the rock-shafts, and the latches on the hand-lever in positions slightly raised above the tooth-rods, and it therefore follows that the entire series of teeth are free to have a limited movement in a vertical direction within the loops of the fingers and below the lifting-bars. This action of the teeth enables them to scratch or dig the surface of the soil and to efficiently remove weeds or other objectionable vegetable growths which may lie in the path of the machine. It frequently becomes necessary to clear the ranks of teeth from the vegetable growths and weeds which may be collected thereby, and to do this for the series of teeth connected with one lifting-bar it is only necessary to move the proper lever in a forward direction, thereby turning the rock-shaft and throwing the crank thereof downwardly, so that the stem will pull the front end of the lifting-lever in a corresponding downward direction, whereupon the rear end of the lever and the lifting-bar will be raised so as to elevate one-half the number of toothed rods to the proper raised position. Of course the lever can be turned to its former position and the teeth may thus be lowered, so as to resume their action in cultivating the soil around the roots of growing plants and in destroying weeds. When it is desired to subject the teeth to pressure in order to force them into the ground and dig around the roots of the plants, the hand-lever should be drawn in a backward direction, and the crank of the rock-shaft is thus raised. The stem is pushed upwardly through the eye in the front end of the lifting-lever, and the coiled spring is thus made to act against the lifting-lever in a manner to raise the front end thereof and forcibly press downward the rear end. The pressure of the spring is thus communicated through the lever to the lifting-bar, which is made to act upon one-half of the toothed rods in the machine; but, of course, the other lever may be adjusted in a similar manner, so as to make the two lifting-bars positively depress the entire number of teeth.

Changes within the scope of the appended claims may be made in the form and proportion of some of the parts while their essential features are retained and the spirit of the invention is embodied. Hence I do not desire to be limited to the precise form of all the parts as shown, reserving the right to vary therefrom.

Having thus described my invention, what I claim as new is—

1. A cultivator comprising a wheeled axle, a series of rods having individual pivotal connection with said axle and provided with teeth arranged in different ranks, bars having looped fingers loosely receiving the rods, and means for raising and lowering the bars and their fingers with relation to the rods, substantially as described.

2. A cultivator comprising a wheeled axle, a series of teeth having individual pivotal connection therewith, bars loosely connected with said teeth, hand-levers mounted on the axle, and trains of operative connections, including a spring, and disposed between the hand-levers and the bars, whereby each bar may be adjusted and may be subjected to pressure, substantially as described.

3. A cultivator comprising a wheeled axle, a multiplicity of teeth having individual pivotal connection therewith, bars loosely connected with said teeth, levers fulcrumed on the axle and attached to said bars, crank-shafts mounted on the axle and provided with hand-levers, and spring-links between the cranks and the levers which are attached to the bars, substantially as described.

4. A cultivator comprising a wheeled axle, a pivotal rod thereon, a multiplicity of socketed pivotal blocks loosely fitted on said pivotal rod, a plurality of rods clamped individually in the sockets of the pivotal blocks and provided with teeth arranged in different ranks, bars loosely connected with said rods, and means whereby the bars may be raised and lowered, substantially as described.

In witness whereof I have hereunto set my hand in the presence of two witnesses.

JOHN CLARK.

Witnesses:
J. D. HAVERSON,
E. L. WATSON.